United States Patent

[11] 3,576,373

[72] Inventors Frederick Bien;
 Ronald V. Gonder, China Lake, Calif.
[21] Appl. No. 868,483
[22] Filed Oct. 22, 1969
[45] Patented Apr. 27, 1971
[73] Assignee the United States of America as represented by the Secretary of the Navy

[54] AN AIRCRAFT GUNSIGHT INCLUDING A PIVOTALLY MOUNTED REFLECTOR PLATE
1 Claim, 5 Drawing Figs.
[52] U.S. Cl. .................................................. 356/251
[51] Int. Cl. ............................................... G02b 23/10
[50] Field of Search .......................................... 356/251; 350/174

[56] References Cited
FOREIGN PATENTS
1,073,413  9/1954  France

*Primary Examiner*—Ronald L. Wibert
*Assistant Examiner*—Orville B. Chew, II
*Attorneys*—R. S. Sciascia, Roy Miller and Gerald F. Baker ABSTRACT: An aircraft gunsight having an angularly mounted reflector plate assembly pivoting around an axis through the outer extremity of two depending legs and having means for frictionally applying torque to the assembly near said axis is modified by substituting means applying torque at a point along the reflector plate remote from the pivotal axis of the depending legs.

PATENTED APR 27 1971 3,576,373

INVENTORS.
FRED BIEN
RONALD V. GONDER
BY ROY MILLER
ATTORNEY.
GERALD F. BAKER
AGENT.

AN AIRCRAFT GUNSIGHT INCLUDING A PIVOTALLY MOUNTED REFLECTOR PLATE

GOVERNMENT INTEREST

The invention described herein may be manufactured and used by or for the Government of the United States of America for governmental purposes without the payment of any royalties thereon or therefor.

BACKGROUND OF THE INVENTION

Originally A4 aircraft were provided with a gunsight having an angular reticle carrier comprising two depending legs and the carrier was rotated about an axis through the extremeties of the legs by means of a frictionally attached arm which followed a cam arrangement controlled by a calibrated adjustment wheel. A spring in the split follower arm held two rollers across a slot in the arm. Struts extending from the reflector plate were clamped by a locking yoke to hold the reflector plate in adjusted position.

The accuracy of this gunsight was inherently sensitive to slippage in the mount and to any constraint of linkage movement, such as friction at the pivot points or clamps. The friction essentially resisted the springs in the split follower arm allowing the rollers to separate from the cam. Accuracy and repeatability of the gunsight were usually impaired to an unacceptable extent.

According to the present invention the locking yoke and struts have been eliminated, the reflector plate mounting has been strengthened, the split follower arm has been replaced by an arm connected to the reflector plate mounting and the adjustment means has been replaced by substituting a rack and pinion setting for the cam arrangement.

DESCRIPTION OF THE INVENTION

Figure 1:
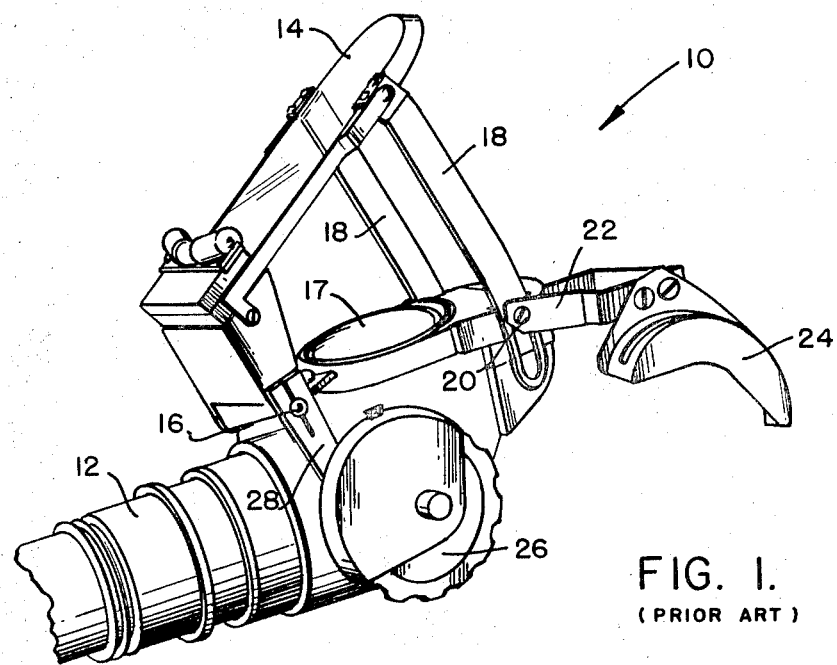
FIG. 1 is a perspective view of a first prior art gunsight.

The A4 gunsight 10 shown in FIG. 1 is designed to be mounted to an aircraft by an angular frame 12 and contains the usual reticle optics to form a reticle image on a reflector plate 14. The reflector plate 14 is pivoted to the body 12 at 16 and is braced by two struts 18 fastened to the body at 20. The struts 18 may be locked in place at 20 by a locking lever 22 carrying a protector 24. Movement of the reflector plate 14 theoretically may only be accomplished when the locking arm 22 is in the release position as shown in FIG. 1. Movement of the reflector plate is accomplished through a cam arrangement (not shown) between the adjustment roller 26 acting through cam action to move a slotted lever 28. When the lever 22 is depressed the cover 24 is positioned to prevent inadvertent manipulation of wheel 26.

Figure 2:
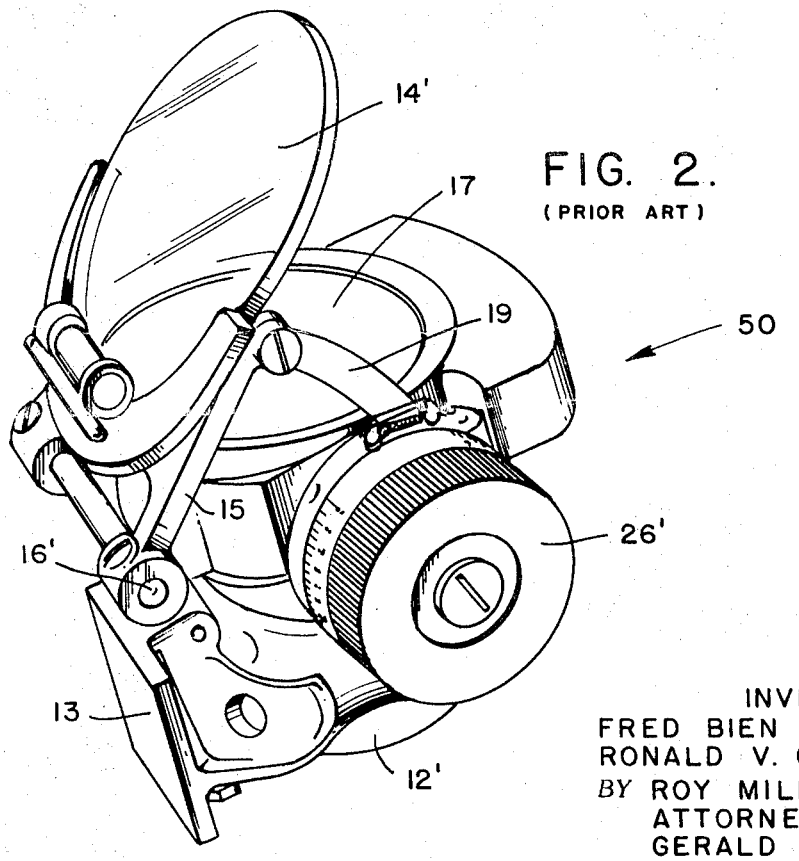
FIG. 2 is a perspective view of a second prior art gunsight.

Another reflector plate device in prior use is shown at 50 in FIG. 2 wherein the reflector plate 14' is designed to be pivoted by a setting drum 26' fastened to frame member 12'. The reflector plate 14' which is pivoted around point 16' and arm 19 connected to the support member 15 are moved by the setting drum 26' through a pinion gear 27 (see FIG. 5) acting upon teeth along one side of the arm 19. This gunsight is mounted to the aircraft by bracket 13 attached to the body 12'.

Figure 3:
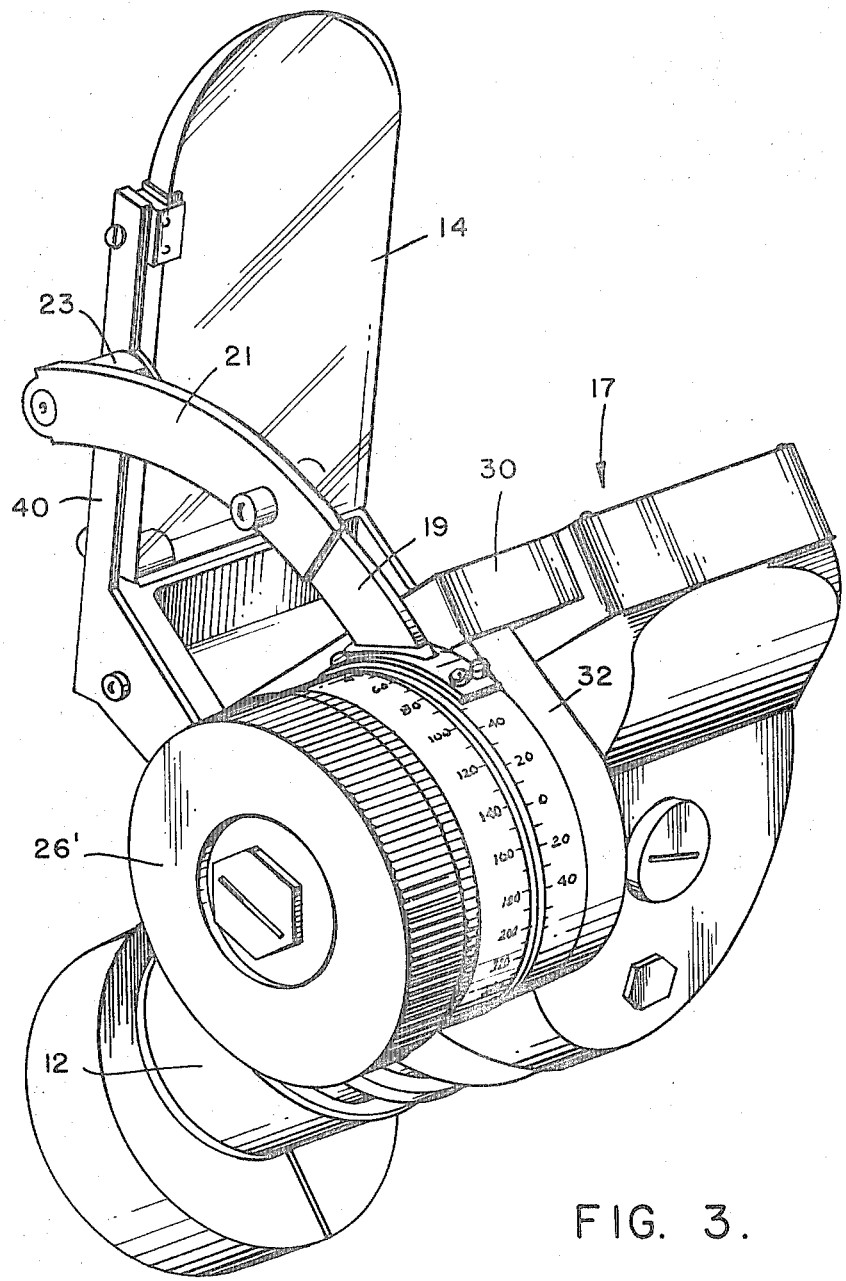
FIG. 3 is a perspective view of the gunsight according to the present invention.
Figure 4:
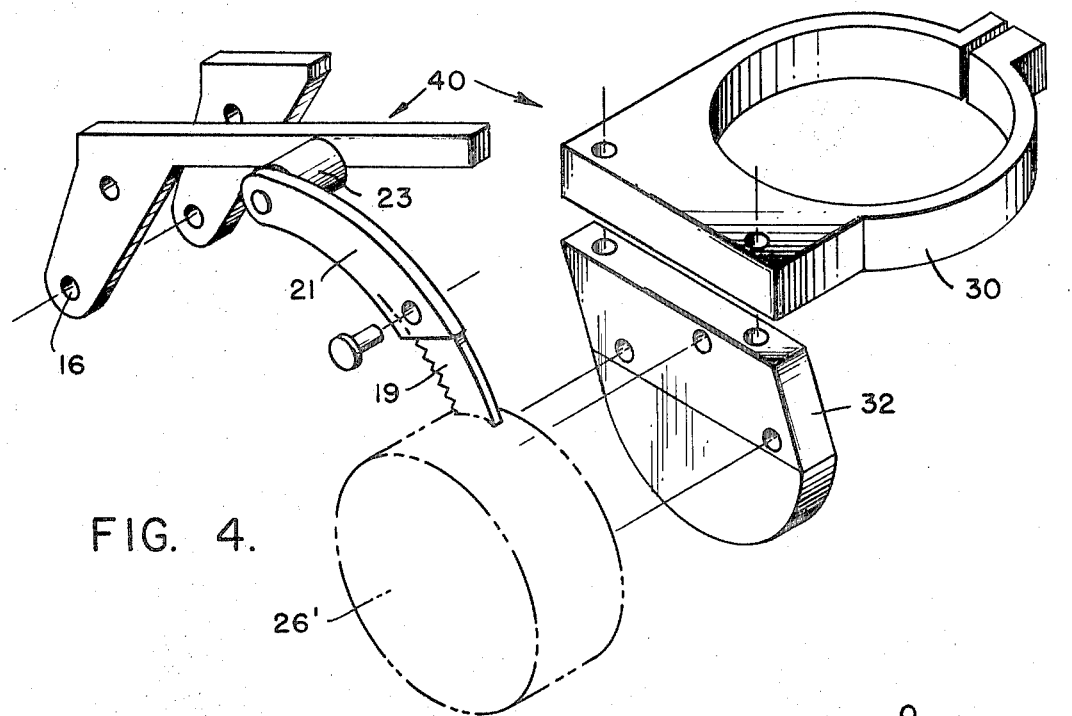
FIG. 4 is an expanded view of parts necessary to construction of the FIG. 3 gunsight.

FIG. 3 shows the present modification wherein body 12 is identical with the body in FIG. 1. However, the rotating wheel 26 has been removed and replaced by a setting drum 26' identical to that in FIG. 2. In order to accomplish the mounting of setting drum 26', an adapter clamp 30 (see FIG. 4) has been placed around the optical window 17 and which clamp carries a mounting plate 32 for mounting the drum 26'. The reflector plate 14 has been retained but a more rugged frame 40 has been provided which conforms to the shape of the original frame and is mounted at the same pivot position 16. An arm 21 extends the rack arm 19 and is pivoted to the frame 40 at 23.

The modified gunsight (FIG. 3) comprises, therefore, the A1 Mk 20 Mod 4 (FIG. 2) rack and pinion drum fitted with the A4, P/N 355,336 (FIG. 1) reticle projection optics and reflector plate. The final configuration is shown in FIG. 3. An important feature in adapting the Mk 20 drum was preservation of calibration (i.e., when the drum is rotated by a given mil setting, the reflector must also rotate to the indicated mil setting).

Figure 5:
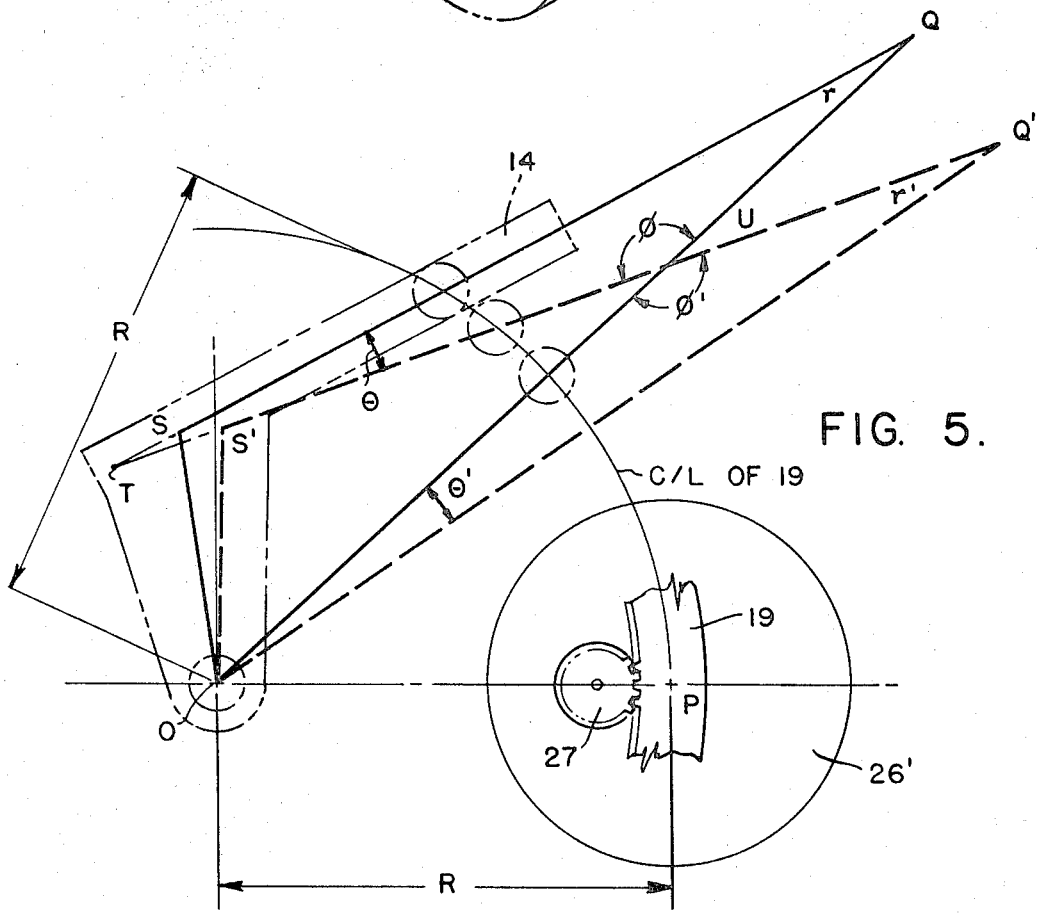
FIG. 5 is a graphical representation of the respective reflector plates of FIGS. 2 and 3, illustrating the geometrical placement of parts.

The geometry involved in the placement of parts for proper calibration is illustrated in FIG. 5 wherein the angular reticle carrier 14 is represented by angle OSQ and the planar reticle carrier 14' is represented by the line OQ. Pivot point O represents axis 16 and 16' around which the carriers may be moved.

If the drum is moved by a mil setting $\theta$, the reflector 14 should also move by $\theta$ mils. To preserve this calibration, the drum 26' must be retained at a radius R (OP) when the drum is transferred to the (FIG. 1) gunsight.

This same radius R then locates the point on reticle carrier 14 at which arm 19 must be pivoted in order for the arcuate movement of carrier 14 to coincide with the calibration of drum 26'.

With reference to FIG. 5 it can be shown that $\theta=\theta'$.

1. $\gamma'=\gamma$; $\gamma$ is one of angles of $\Delta S'QQ'$;
2. $\Phi'=\Phi$; alternate angles;
3. $\therefore$, $\Delta$,s OUQ and TUQ' are similar; and
4. $\theta=\theta'$ as corresponding angles of similar $\Delta$'s.

We claim:

1. In an aiming device for aircraft or the like, comprising:

body means having a longitudinal axis and including means for mounting said body to an aircraft with said longitudinal axis substantially parallel to the normal line of flight of said aircraft;

window means in said body spaced above and having an optical axis orthogonal to said longitudinal axis;

reticle optics in said body projecting a reticle image upward through said window;

a reflector plate;

means for pivotally mounting said reflector plate in a plane intercepting said optical axis; and means for accurately positioning said reflector plate within a range of possible positions wherein said reticle image is visible in the plane of said reflector plate apparently overlying terrain or objects visible through said reflector plate along a view line substantially parallel to said line of flight;

the improvement comprising:

said means for mounting said reflector plate including a pair of depending legs pivotally mounted on a shaft affixed to said body;

a side arm integral with one of said legs lying alongside and attached to one edge of said reflector plate;

arcuate linkage means pivotally connected to said arm; and adjustment means comprising means to incrementally move said linkage means.